Dec. 15, 1931.    W. BETZ    1,837,103
WELDED SPIGOT AND SOCKET JOINT
Filed March 20, 1930
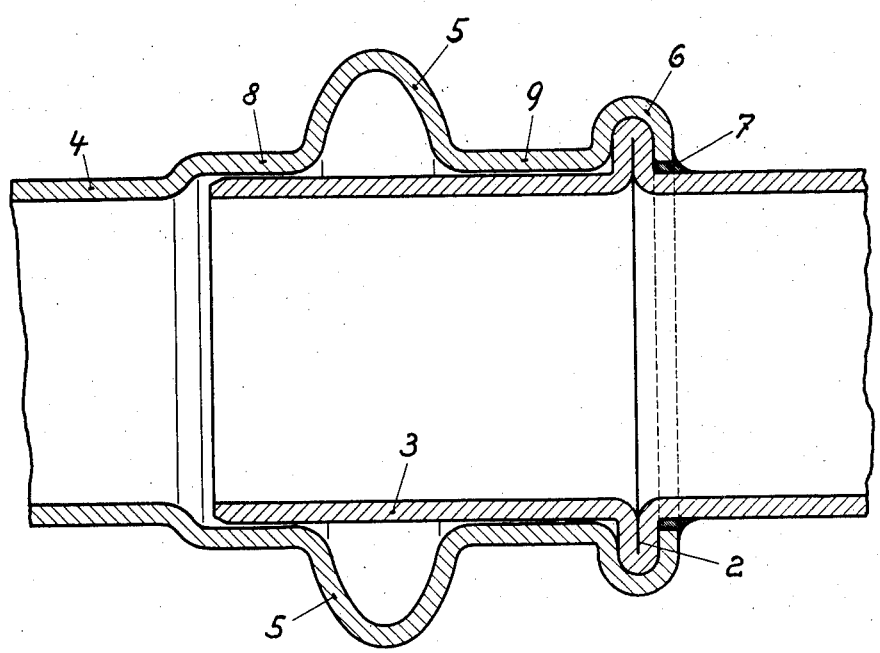
Inventor:
W. Betz
By: Marks &Clear
    Attys.

Patented Dec. 15, 1931

1,837,103

UNITED STATES PATENT OFFICE

WILHELM BETZ, OF ESSEN-ON-THE-RUHR, GERMANY

WELDED SPIGOT-AND-SOCKET JOINT

Application filed March 20, 1930, Serial No. 437,556, and in Germany April 17, 1929.

Welded spigot-and-socket joints are already known of the type wherein, for the purpose of relieving the welding seam, the spigot end extending into the socket is provided with an outwardly directed flanged-over edge over which the free socket end is turned down and connected thereto by welding. In this type of welded spigot-and-socket joints the difficulty is being experienced that in the laid pipe lines compensators have to be provided in suitably spaced relation in order to compensate for the alterations in length due to variations in temperature or the like.

It is the object of the present invention to provide a relieved welded spigot-and-socket joint which is yieldingly constructed in the direction of the longitudinal axis of the pipe in such a way that it is capable of completely taking up the alterations in length of the pipe lines caused by variations in temperature or movements of the ground without the provision of special compensators in the pipe lines.

According to the invention this is being accomplished by providing the socket end with a number of collar-shaped enlargements and by extending the spigot end beyond a ring-shaped projection which forms the flanged-over edge so as to cause the spigot end to close the annular space formed by the rearward collar-shaped enlargement of the socket end, the free end of the spigot end being guided in a guiding part expanded to form a socket and arranged past the rearward enlargement of the socket pipe as well as in a similar guiding part provided between the two enlargements of the socket end. The welded socket joint proper is being produced in known manner by turning the free edge of the forward enlargement of the socket end down over the flanged-over edge of the spigot end formed by the ring-like projection and welding these parts together.

By providing a double guide for the spigot end which extends beyond the collar-shaped enlargement, one succeeds in securing a particularly satisfactory compensation of the forces acting at a right angle to the axis of the pipe and the welded spigot-and-socket joint proper will be successfully relieved of the said forces which tend to break up the welding seam.

Another feature of the invention consists in the fact that the rearward collar-shaped enlargement of the socket end is of such a shape and of such dimensions as to be capable of relieving the forward enlargement and at the same time successfully compensating the longitudinal stresses set up in the laid pipe of the pipe line so that the alterations in length occurring in the laid pipe lines which are being caused by variations in temperature or the like, cannot act deleteriously upon the welded spigot-and-socket joint proper.

In consequence of the fact that the rearward compensating collar-shaped enlargement forms a tightly closed annular space together with the inserted spigot end which is guided on both sides of the enlargement, it is possible with the new welded spigot-and-socket joint to fill the said annular space formed by the second enlargement through a suitable inlet opening with a bituminous or similar, for example rust proofing filling substance.

One embodiment of the invention is shown in the annexed drawing.

The spigot end 1 is provided with a ring-shaped projection 2 which terminates in the smooth extension 3. The socket end 4 possesses a rearward enlargement 5 of a collar-like shape and a forward enlargement 6 of a socket-like shape against which abuts the ring-shaped projection 2 of the spigot end. After the free end of the enlargement 6 has been turned down, the welded spigot-and-socket joint proper is being completed by the welding seam 7.

Beyond the collar-shaped enlargement 5 the spigot end 3 extends into the part 8 which has been enlarged to form a socket whereas between the enlargements 5 and 6 the guiding part 9 embraces the spigot end 3.

Having thus described my invention what I claim as new and desire to secure by Letters Patent is:

1. Welded spigot-and-socket joint of the type wherein, for the purpose of relieving the welding seam, the spigot end extending into the socket is provided with an outwardly directed flange-like projection over which the free end of the socket has been turned down and connected thereto, characterized by the fact that the socket end is provided with a plurality of collar-shaped enlargements whereas the spigot end is extended beyond a ring-shaped collar forming the flange-like projection in such a way as to close the space formed by the rearward collar-shaped enlargement of the socket end, the said extension of the spigot end being guided in a guiding part enlarged to form a socket and arranged past the rearward enlargement of the socket pipe as well as in a similar guiding part arranged between the two enlargements of the socket end.

2. Welded spigot-and-socket joint according to claim 1 characterized by the fact that the rearward collar-shaped enlargement of the socket end is of such a shape and of such dimensions as to be capable of relieving the forward enlargement which embraces the flange-like projection of the spigot end and at the same time compensating the longitudinal stresses of the laid pipe of the pipe line.

WILHELM BETZ.